United States Patent

[11] 3,596,947

| [72] | Inventor | Masamichi Ishihara<br>Ama-gun, Aichi Prefecture, Japan |
| --- | --- | --- |
| [21] | Appl. No. | 845,261 |
| [22] | Filed | July 28, 1969 |
| [45] | Patented | Aug. 3, 1971 |
| [73] | Assignee | N.G.K. Insulators, Ltd.<br>Nagoya, Japan |
| [32] | Priority | Oct. 3, 1968, Nov. 28, 1968 |
| [33] | | Japan |
| [31] | | 43/85,748 and 43/103,214 |

[54] SECURITY CONNECTOR FOR INSULATORS AND FITTINGS THEREOF
12 Claims, 16 Drawing Figs.

[52] U.S. Cl. .................................................... 287/100, 174/150
[51] Int. Cl. ....................................................... F16c 11/00
[50] Field of Search ........................................... 287/100; 85/5 CP, 8.1; 174/161, 150, 207, 182, 141; 59/86, 93

[56] References Cited
UNITED STATES PATENTS

| 432,735 | 7/1890 | Helm | 59/86 X |
| --- | --- | --- | --- |
| 437,388 | 9/1890 | Wooster | 287/100 X |
| 605,656 | 6/1898 | Taylor | 59/86 UX |
| 1,030,527 | 6/1912 | Nelson | 287/100 X |
| 2,259,880 | 10/1941 | Ehmann | 59/86 |
| 2,484,759 | 10/1949 | Starr | 287/100 |
| 3,110,509 | 11/1963 | Schlichting et al. | 287/100 X |
| 3,250,171 | 5/1966 | Taylor | 287/100 X |

Primary Examiner—David J. Williamowsky
Assistant Examiner—Andrew V. Kundrat
Attorney—Stevens, Davis, Miller & Mosher ABSTRACT: A security connector for insulators and fittings thereof, which connects a clevis and a tongue by a clevis pin. The clevis has a clawlike projection integrally formed therewith, which engages a cutaway portion of the pinhead of the clevis pin when the connector is loaded, so as to hold the clevis pin in position. The cutaway portion of the pinhead also allows the insertion of the clevis pin into the connector without striking the projection of the clevis by the pinhead. The clevis pin can have a stop lug integrally formed on the opposite end of the clevis pin to the pinhead, which stop lug is small enough to allow the insertion of the clevis pin into the clevis and the tongue but large enough to engage the clevis surface when the connector is not loaded, so as to prevent the axial movement of the clevis pin. With the security connector, the risk of dripping of powerline conductors can be eliminated.

PATENTED AUG 3 1971

FIG_6
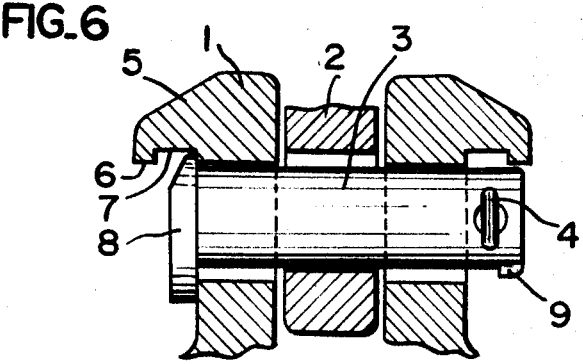
FIG_7
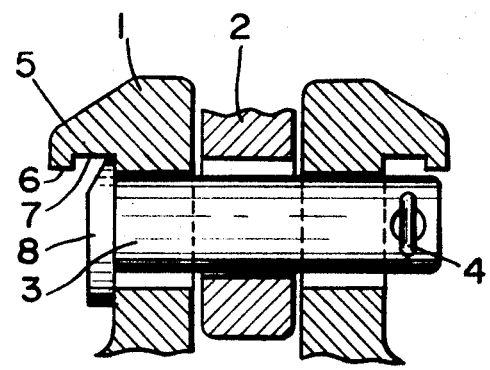
FIG_8
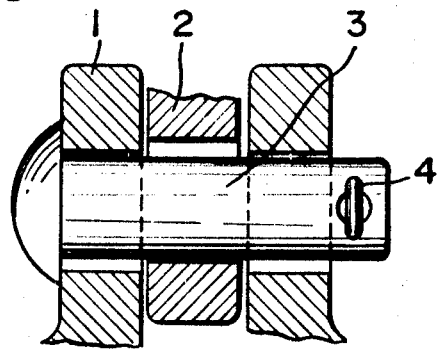

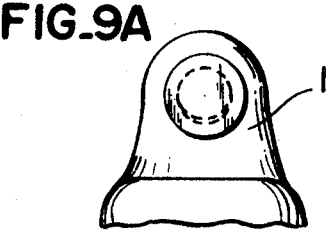
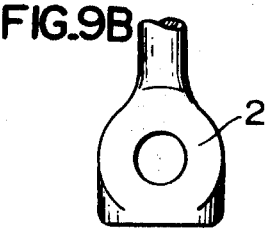
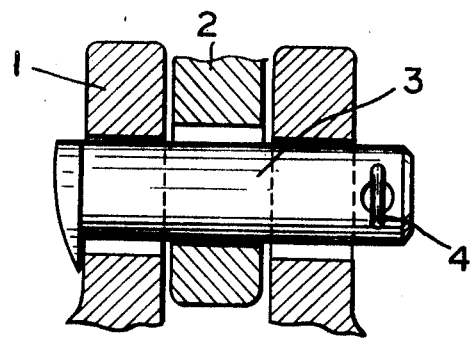
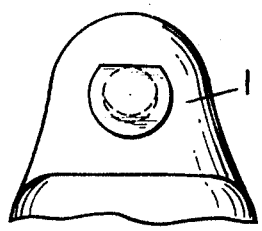
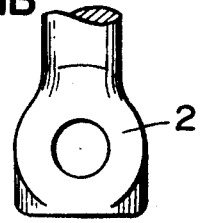
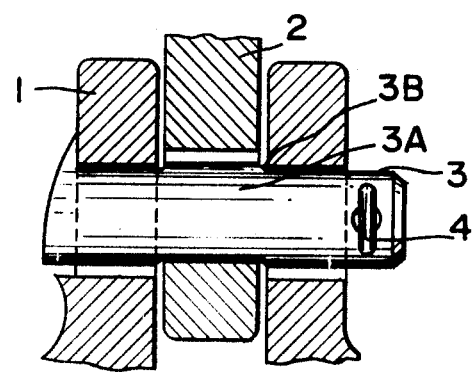

SECURITY CONNECTOR FOR INSULATORS AND FITTINGS THEREOF

This invention relates to a security connector for insulators and fittings thereof, and more particularly to a security connector for insulators and fittings thereof by preventing a clevis pin from dropping from the connector, which is especially useful in connecting insulators and fittings in electric transmission and distribution lines, electric railway feeders, and the like.

There is a known connector for connecting insulators of overhead powerlines and fittings thereof, which uses a clevis and a tongue, connected together by a clevis pin. The clevis pin of the known connector sometimes falls down from the connector structure, because a split pin holding the clevis pin in position is corroded after years of service or broken by repeated vibration of powerline conductors or by some other unforeseeable reasons. As a result of such fall of clevis pins, insulators and fittings may be separated from conductor-holding assemblies, such as insulator strings, to cause a serious fault like the dropping of powerline conductors.

In order to prevent the fall of the clevis pin, it has been proposed to use a clevis pin formed in a special shape so as to ensure reliable connection between the clevis and the tongue. The proposed clevis pin of special shape, however, inevitably includes a sharp corner which is undesirable from the standpoint of material fatigue. The alternating or vibrating load present in overhead powerlines quickly causes considerable fatigue at any sharply bent corner of the clevis pin to accelerate the breakdown of the clevis pin.

An object of the present invention is to prevent powerline faults due to the dropping of powerline conductors.

Another object of the present invention is to provide a security connector for insulators and fittings thereof, which is capable of preventing the dropping of powerline conductors.

It is another object of the present invention of provide a security connector for insulators and fittings thereof, in which the connecting portion of the connector is subjected to tensile loading.

Another object of the present invention is to provide a connector of the last-mentioned type, which does not allow its clevis pin to fall down not only when the connector is loaded, but also when the connector is momentarily unloaded due to abnormal wind pressure or sudden fall of snow or ice pile from line conductors. The clevis pin of the connector of the invention is also prevented from falling, even when a split pin holding the clevis pin is corroded or lost by some reasons.

A further object of the present invention is to provide a security connector for insulators and fittings thereof, which eliminates the need of inspection and maintenance work.

An object of the present invention is to provide a clevis pin usable in a connector of clevis and tongue type, whose fatigue is considerably smaller than that of known clevis pin when subjected to an alternating or vibrating load.

The foregoing objects and other objects as well as the characteristic features of the invention will become more apparent and more readily understandable by the following description and the appended claims when read in conjunction with the accompanying drawings, in which:

FIG. 6 is a partial enlarged sectional view, illustrating the position of the clevis pin relative to the clevis and the tongue of the connector according to the present invention, shown in the state as being subjected to a tensile load;

FIG. 7 is a partial enlarged sectional view similar to FIG. 6, showing another embodiment of the present invention;

FIGS. 8 and 10 are partial enlarged sectional views, illustrating two known connectors of clevis and tongue type, respectively;

FIGS. 9A, 9B and FIGS. 11A, 11B are end views of the connectors of FIGS. 8 and 9, respectively; and FIG. 12 is a partial enlarged sectional view, similar to FIG. 3, illustrating another known connector, which is specially designed for strictly preventing a clevis pin from falling.

Figure 1:
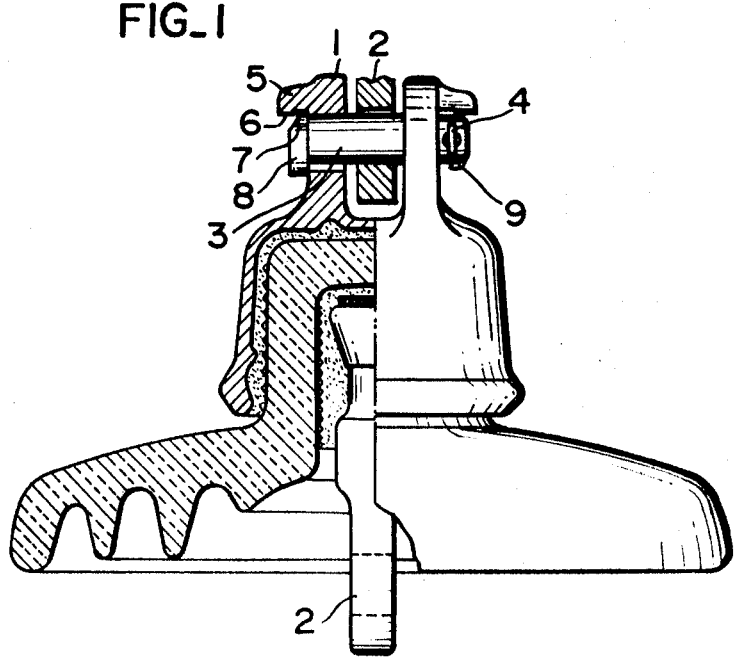
FIG. 1 is an elevation, partly in section, of a preferred embodiment of a security connector for insulators and fittings according to the present invention, shown in the state as applied to a suspension insulator.
Figure 2A:
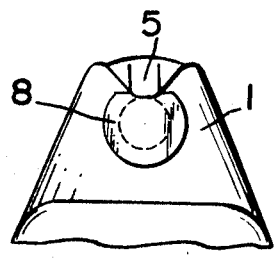
FIGS. 2A and 2B are side views, illustrating the connecting portions of a connector of clevis and tongue type according to the present invention.
Figure 2B:
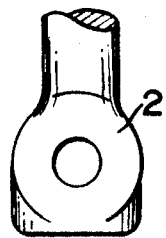

Referring to FIGS. 1 to 7, a preferred embodiment of connector according to the present invention comprises a clevis 1 having a pair of coaxial connecting holes, a pair of projections 5 formed in the proximity of the connecting holes so as to extend outwardly from the tip of the clevis in parallel with the axis of the connecting holes, step portions 6 each formed on that surface of the projection 5 which faces the axis of the connecting holes, and a stop groove 7 formed on the step portion so as to make one edge of the stop groove flush with the outer surface of the clevis around the connecting hole; a tongue 2 with a connecting hole which cooperates with the connecting holes of the clevis 1 when the tongue 2 engages the clevis 1; a clevis pin 3 having an elongated stem with a diameter smaller than that of the connecting holes of the clevis 1 and tongue 2, a pinhead 8 formed at one end of the stem with a diameter larger than that of the connecting holes of the clevis 1, a part of said pinhead being cut away to allow the insertion of the clevis pin 3 into the connecting holes of the clevis and the tongue without striking the step portion 6 of the clevis 1 by the pinhead, the pinhead being preferably provided with a chamfered portion 8a along the cutaway portion, the thickness of the chamfered portion gradually decreases as the pinhead extends away from the center of the pinhead 8, and a hole for split pin bored at the opposite end of the stem; and a split pin 4 being fitted in said hole for split pin of said clevis pin 3 after the clevis pin is inserted into the connecting holes of the clevis and the tongue.

Figure 4A:
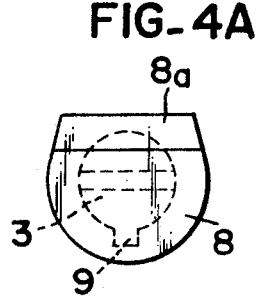
FIGS. 4A and 4B are end views of the clevis pin of FIG. 3, taken from the left-hand end and the right-hand end of FIG. 3, respectively.
Figure 4B:
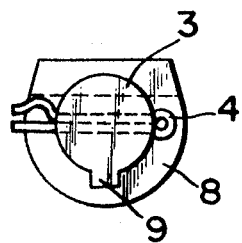

In the embodiment, as shown in FIGS. 4A and 4B, the clevis pin 3 has a stop lug 9 integrally formed at the right-hand end of the stem. The stop lug 9 extends in a diametrically opposite direction to the cutaway portion of the pin head 8 secured to the left-hand end of the stem.

Figure 3:
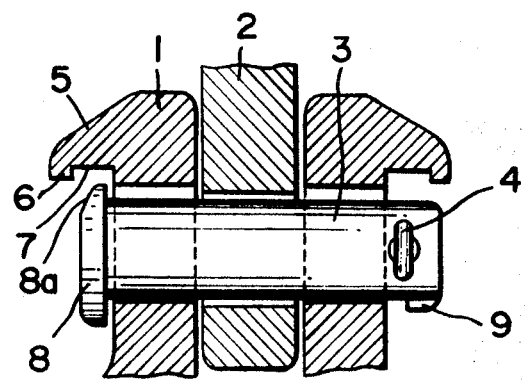
FIG. 3 is a partial enlarged sectional view, illustrating the position of a clevis pin, relative to the clevis and the tongue of the connector of FIG. 1, shown in the state as being unloaded.

Referring to FIG. 3, when the connector is not mechanically loaded, the clevis pin can be inserted through the connecting holes of the clevis 1 and the tongue 2, while moving the cutaway portion of the pinhead 8 without striking the step portion 6 of the projection 5 of the clevis 1. The cutaway portion faces the stop groove 7 of the projection 5 with a spacing therefrom, unless the connector is loaded.

Figure 5:
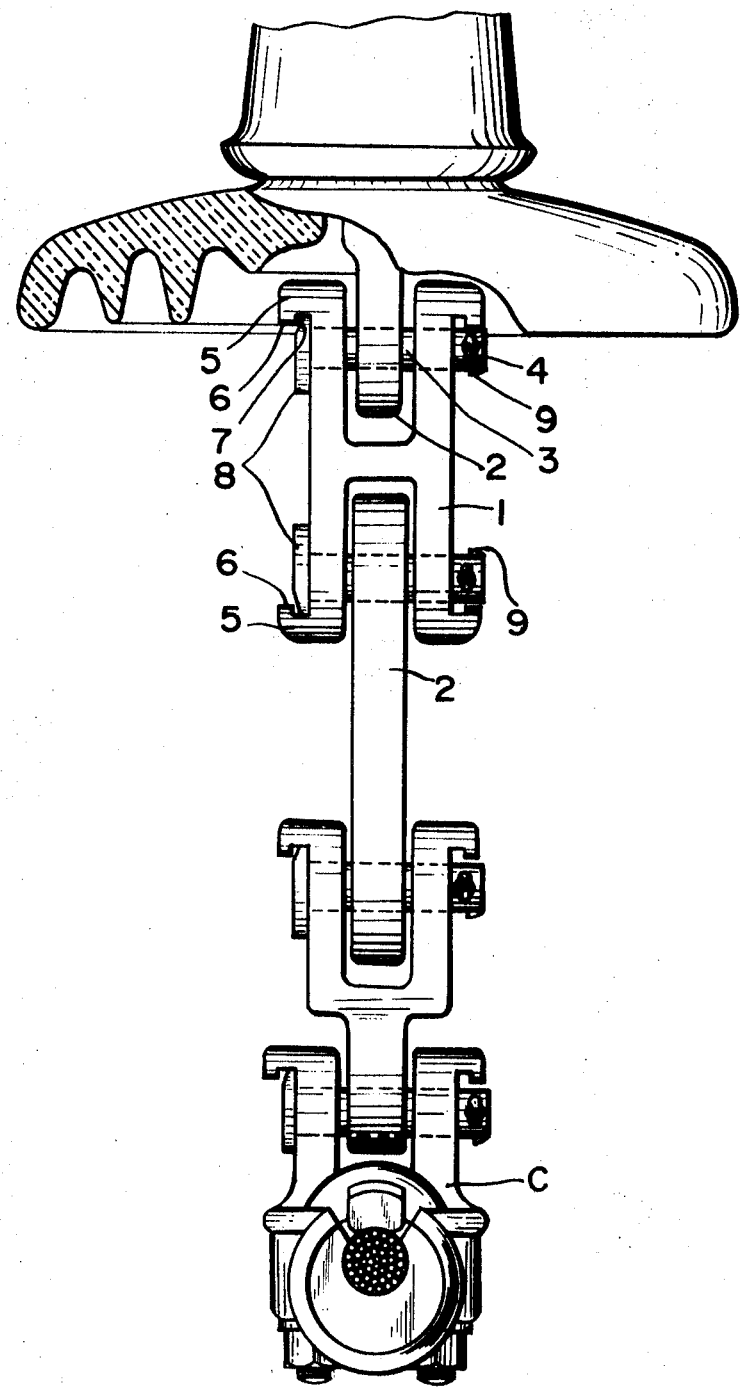
FIG. 5 is an elevation, partly in section, of connectors according to the present invention, shown in the state as being incorporated in a suspension string including a suspension clamp depending from a suspension insulator.

FIG. 5 shows the connector under loaded conditions. In the figure, a suspension insulator is connected to a suspension clamp C by connectors according to the present invention. It is apparent from the figure that the connectors are subjected to a tensile stress or suspension loading.

As can best be seen from FIG. 6, under the loaded conditions, the clevis pin 3 is vertically pulled by the tongue 2 in a direction away from the clevis 1. After travelling the distance corresponding to the no-load spacing between the clevis pin 3 and the periphery of the connecting holes of the clevis 1, the cutaway portion of the pinhead 8 of the clevis pin 3 comes into engagement with the stop groove 7 of the projection 5 of the clevis 1, and the cutaway portion comes to rest in the stop groove 7, as long as the connector is subjected to a tensile load. Accordingly, even if the clevis pin 3 is forced to move in the axial direction by some reasons, the pin head 8 strikes the step portion 6 of the projection 5 of the clevis 1 on the one hand, and strikes the outer surface of the clevis 1, on the other hand. Thus, the clevis pin 3 never falls out of the loaded connector, even if the split pin 4 should be removed from the hole for split pin of the clevis pin 3.

Referring to FIGS. 3, 4A, and 4B, a stop lug 9 is integrally formed at the right-hand end or free end of the stem of the clevis pin 3, which extends in the diametrically opposite direction to the cutaway portion of the pinhead 8. The stop lug 9 is made small enough to allow the insertion of the clevis pin 3 into the connecting holes of the clevis 1 and the tongue 2, but large enough to engage the outer surface of the clevis 1 when the connector is unloaded. As pointed out in the foregoing, the split pin 4 can be removed from the clevis pin 3 during service due to corrosion or mechanical shock causes by sudden falling of snow or ice pile from power line conductors or strong wind. It is known that the aforesaid mechanical shock can also momentarily force the connector into the no-load position. With the stop lug 9 formed at the free end of the clevis pin 3, even if the split pin 4 is lost from the clevis pin 3 and the connector is forced to assume the no-load position during the service, the clevis pin 3 cannot be separated from the connector, because the stop lug 9 engages the outer surface of the clevis 1 to prevent the axial movement of the clevis pin 3 away from the connecting holes of the clevis 1 and the tongue 2.

For normal applications, however, a clevis pin 3 without a stop lug 9 will do, as depicted in FIG. 7, because the connector is normally kept under loaded conditions except for the aforesaid abnormal conditions of very remote chance. In fact, the engagement of the pinhead 8 with the stop groove 7 of the clevis 1 will considerably reduce the risk of the moving away to the clevis pin 3 from the connecting holes of the clevis 1 and the tongue 2, as compared with the corresponding risk of known connectors.

On the other hand, with known connectors for insulators and fittings thereof, as shown in FIGS. 8 to 11B, it can be easily seen that a clevis pin 3 tends to fall out of connecting holes of a clevis 1 and a tongue 2, as soon as a split pin 4 removed from the clevis pin 3 by some reasons or other. The falling out of the clevis pin 3 in the known connector will be accelerated if the connector is subjected to an alternating load.

It is also known to use a clevis pin 3 with an axially offset potion, as shown by 3A in FIG. 12. The axially offset portion 3A appears to be effective in preventing the clevis pin 3 from falling out of the connector, even if a split pin 4 should be lost, because the offset portion 3A normally engages the connecting hole of the tongue 2 to resist the axial movement of the clevis pin 3. Such offset portion 3A, however, includes sharply bent portions 3B and reduces the mechanical strength, especially the fatigue strength of the clevis pin 3 to a considerable extent.

In the embodiment of FIGS. 4A and 4B, the pinhead 8 is shown as circular with a part thereof cut away. The present invention is, however, not restricted to such circular pinhead. In fact, it is possible in the present invention, to use noncircular pinhead, such as rectangular, hexagonal, or other polygonal pinheads. The cutaway portion of the pinhead 8 has a straight edge in the embodiment of FIGS. 4A and 4B. However, the edge of the cutaway portion is not restricted to be straight, but it can be of any shape, provided that the clevis pin 3 can be inserted into the connecting holes of the clevis 1 and the tongue 2 without striking, or being blocked by, the projection 5 of the clevis 1, so as to bring the pinhead 8 into engagement with the outer wall of the clevis 1.

Furthermore, the connector according to the present invention can be manufactured without forming a chamfered portion 8a on the pinhead 8 of the clevis pin 3.

As described in the foregoing, according to the present invention, the falling out of a clevis pin from a connector can effectively be prevented, even when a split pin holding the clevis pin is worn out or lost while the connecting portion between a clevis and a tongue being subjected to an alternating or vibrating load. In the connector of the present invention, the clevis pin is straight and does not have any bent portion like an axially offset portion in a known connector of FIG. 12. Thereby, the connector of the present invention has a high mechanical strength, especially a high fatigue strength. In fact, with the connector according to the present invention, the regular inspection and maintenance of the connector in powerline can be eliminated. Thus, the present invention contributes greatly to the industry.

I claim:

1. A security connector for insulators and fittings thereof, comprising a clevis having a pair of substantially annular connecting holes coaxially formed on parallel members of the clevis, a pair of projections integrally formed at the tips of the parallel members in the proximity of the connecting holes so as to extend away from each other in parallel with the axis of the connecting holes, a pair of step portions each formed on that surface of the projection which faces the axis of the connecting holes, and a pair of stop grooves each formed on the step portion so as to make one edge of the stop groove flush with the outer surface of the clevis around the connecting hole; tongue with a connecting hole cooperating with the connecting holes of the clevis when the tongue enters between the parallel members of the clevis; a clevis pin having an elongated stem substantially the same diameter as and removably penetrating through said connecting holes of said clevis and said tongue to connect the tongue to the clevis, a pinhead integrally formed at one end of the stem whose cross section lateral to the axis of said stem is larger than that of said connecting hole of the clevis, said pinhead having a cutaway portion which reduces said lateral cross section to such extent that the clevis pin can be inserted into the connecting holes of the clevis and the tongue without striking the step portion of the clevis by the pinhead, the cutaway portion being small enough to cause that edge of the lateral cross section which is thus cut away to extend beyond the periphery of the clevis pin stem so that said edge engages said stop groove when load on the connector forces the tongue away from the clevis, and a hole for split pin bored laterally through the stem at the opposite end thereof; and a split pin being fitted in said hole for split pin of said clevis pin after the clevis pin is inserted in the connecting holes of the clevis and the tongue.

2. A security connector according to claim 1, wherein the outer surface of said pinhead opposing said stem is chamfered along said cutaway portion, so that the thickness of the chamfered portion gradually diminishes as the chamfered portion extends toward the edge of the cutaway portion.

3. A security connector according to claim 1, wherein said cutaway portion of said pinhead and said stop groove of said projection are formed rectilinearly so as to ensure a stable linear contact between the cutaway portion and the stop groove.

4. A security connector according to claim 3, wherein the outer surface of said pinhead opposing said stem is chamfered along said rectilinear cutaway portion so that the thickness of the chamfered portion gradually diminishes as the chamfered portion extends toward the edge of the cutaway portion.

5. A security connector according to claim 1, wherein said pinhead of said clevis pin is circular, and said cut away portion is formed along a chord thereof.

6. A security connector according to claim 5, wherein the outer surface of said pinhead opposing said stem is chamfered along said cutaway portion so that the thickness of the chamfered portion gradually diminishes as the chamfered portion extends toward the edge of the cutaway portion.

7. A security connector for insulators and fittings thereof, comprising a clevis having a pair of connecting holes coaxially formed on parallel members of the clevis, a pair of projections integrally formed at the tips of the parallel members in the proximity of the connecting holes so as to extend away from each other in parallel with the axis of the connecting holes, a pair of step portions each formed on that surface of the projection which faces the axis of the connecting holes, and a pair of stop grooves each formed on the step portion so as to make one edge of the stop groove flush with outer surface of the clevis around the connecting hole; a tongue with a connecting hole cooperating with the connecting holes of the clevis when the tongue enters between the parallel members of the clevis; a clevis pin having an elongated stem removably penetrating through said connecting holes of said clevis and said tongue to connect the tongue to the clevis, a pinhead integrally formed at one end of the stem whose cross section lateral to the axis of the stem is larger than that of said connecting hole of the clevis, said pinhead having a cutaway portion to allow the insertion of the clevis pin into the connecting holes of the clevis and the tongue without striking the step portion of the clevis by the pin head, said cutaway portion engaging said stop groove upon loading of the connector, a stop lug integrally formed at the opposite end and extending along a diametrically opposite direction to said cutaway portion of the pinhead, said stop lug being small enough to allow insertion of the clevis pin through the connecting holes of the clevis and the tongue but large enough to engage the outer surface of the clevis when the connector is unloaded, and a hole for split pin bored laterally through the stem in the proximity of said stop lug; and a split pin being fitted in said hole for split pin of said clevis pin after the clevis pin is inserted in the connecting holes of the clevis and the tongue.

8. A security connector according to claim 7, wherein the outer surface of said pinhead opposing said stem is chamfered along said cutaway portion, so that the thickness of the chamfered portion gradually diminishes as the chamfered portion extends toward the edge of the cutaway portion.

9. A security connector according to claim 7, wherein said cutaway portion of said pinhead and said stop groove of said projection are formed rectilinearly so as to ensure a stable linear contact between the cutaway portion and the stop groove.

10. A security connector according to claim 9, wherein the outer surface of said pinhead opposing said stem is chamfered along said rectilinear cutaway portion so that the thickness of the chamfered portion gradually diminishes as the chamfered portion extends toward the edge of the cutaway portion.

11. A security connector according to claim 7, wherein said pinhead of said clevis pin is circular, and said cutaway portion is formed along a chord thereof.

12. A security connector according to claim 11, wherein the outer surface of said pinhead opposing said stem is chamfered along said cutaway portion so that the thickness of the chamfered portion gradually diminishes as the chamfered portion extends toward the edge of the cutaway portion.